US012685427B2

(12) United States Patent (10) Patent No.: US 12,685,427 B2
Hu et al. (45) Date of Patent: Jul. 21, 2026

(54) METHOD OF OPERATING A DISHWASHER APPLIANCE TO LIMIT USER INVOLVEMENT

(71) Applicant: Haier US Appliance Solutions, Inc., Wilmington, DE (US)

(72) Inventors: Haitian Hu, Louisville, KY (US); Adam Hofmann, Louisville, KY (US); Paul Newsom, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 300 days.

(21) Appl. No.: 18/463,985

(22) Filed: Sep. 8, 2023

(65) Prior Publication Data

US 2025/0082169 A1 Mar. 13, 2025

(51) Int. Cl.
| | |
|---|---|
| *A47L 15/00* | (2006.01) |
| *A47L 15/42* | (2006.01) |
| *A47L 15/46* | (2006.01) |
| *G06N 20/00* | (2019.01) |

(52) U.S. Cl.
CPC ....... *A47L 15/0063* (2013.01); *A47L 15/4293* (2013.01); *A47L 15/46* (2013.01); *G06N 20/00* (2019.01); *A47L 2301/04* (2013.01); *A47L 2501/36* (2013.01)

(58) Field of Classification Search
CPC ............................. A47L 15/0063; A47L 15/46
See application file for complete search history.

(56) References Cited

U.S. PATENT DOCUMENTS

| | | | |
|---|---|---|---|
| 4,735,219 A | * | 4/1988 | Seeland .............. A47L 15/0021 |
| | | | 134/25.2 |
| 5,960,804 A | | 10/1999 | Cooper et al. |
| 8,234,018 B2 | | 7/2012 | Besore et al. |
| 11,289,909 B2 | | 3/2022 | Lyren et al. |

(Continued)

FOREIGN PATENT DOCUMENTS

| | | | | |
|---|---|---|---|---|
| CN | 110464273 A | | 11/2019 | |
| CN | 112826401 A | * | 5/2021 | .............. A47L 15/46 |
| KR | 20080082797 A | | 9/2008 | |

OTHER PUBLICATIONS

Machine translation: CN-112826401-A; Fan et al. (Year: 2021).*

*Primary Examiner* — Natasha N Campbell
(74) *Attorney, Agent, or Firm* — Dority & Manning, P.A.

(57) ABSTRACT
A method of operating a dishwasher appliance to limit user involvement includes receiving, via a user interface of the dishwasher appliance, an indication from a user to start operation of the dishwasher appliance. The method also includes implementing an operational mode for the dishwasher appliance based on one or more user patterns, the operational mode configured to determine a cycle start time for a current wash cycle. Further, the method includes implementing the current wash cycle at the determined cycle start time. After completing the current wash cycle, the method includes updating cycle information stored in at least one of a local memory or a cloud server communicatively coupled to the dishwasher appliance, the cycle information relating to the one or more user patterns. Moreover, the method includes controlling one or more parameters of a subsequent wash cycle of the dishwashing appliance based on the updated cycle information.

18 Claims, 5 Drawing Sheets

(56)             References Cited

U.S. PATENT DOCUMENTS

| 2011/0190953 | A1  | 8/2011 | Park et al. | |
| 2021/0093150 | A1* | 4/2021 | Shin | A47L 15/4295 |
| 2021/0198828 | A1* | 7/2021 | Rosenbauer | A47L 15/0063 |
| 2023/0240508 | A1* | 8/2023 | Miller | A47L 15/507 |
| | | | | 134/56 D |

* cited by examiner

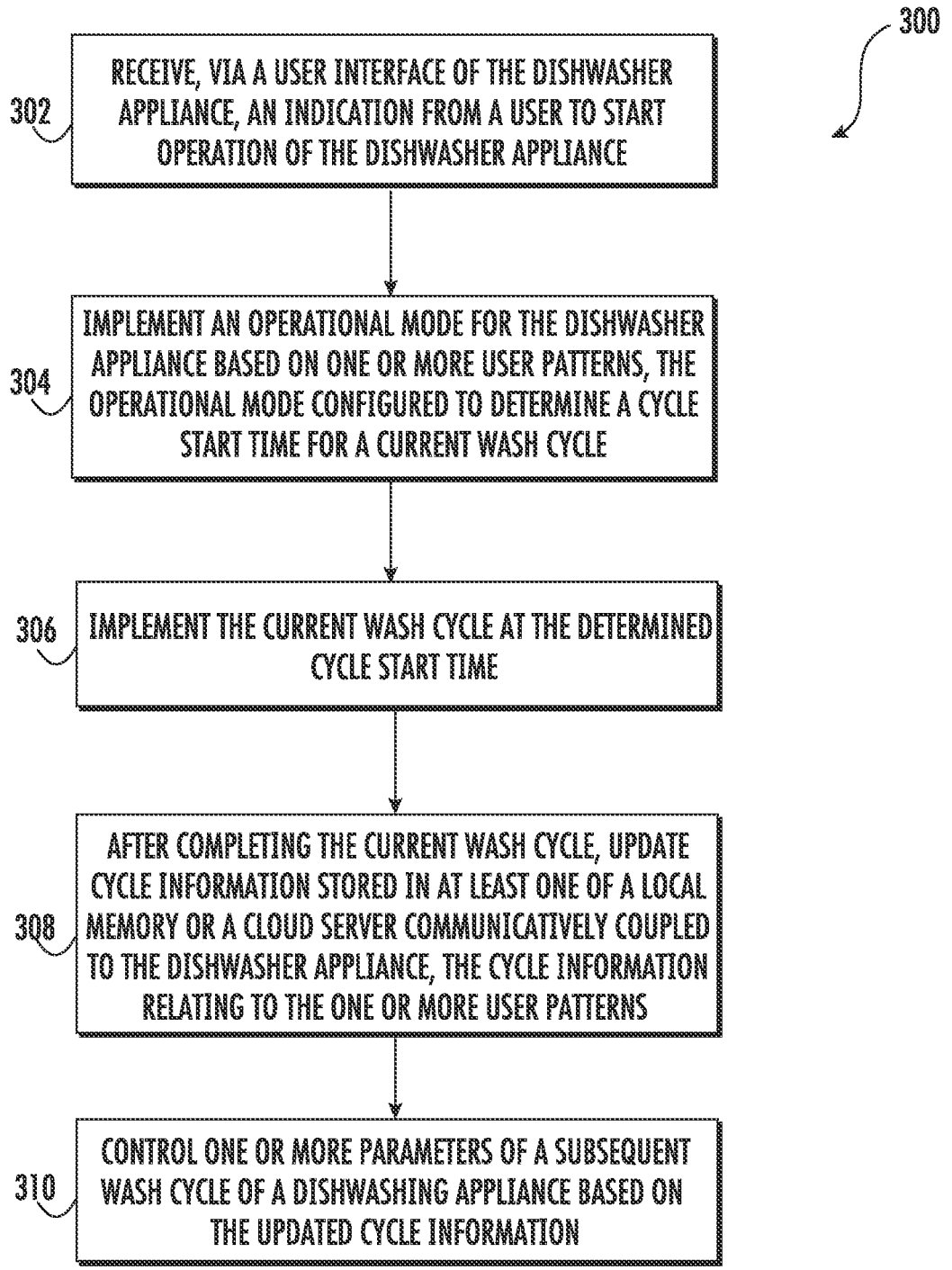

300

302  RECEIVE, VIA A USER INTERFACE OF THE DISHWASHER APPLIANCE, AN INDICATION FROM A USER TO START OPERATION OF THE DISHWASHER APPLIANCE

304  IMPLEMENT AN OPERATIONAL MODE FOR THE DISHWASHER APPLIANCE BASED ON ONE OR MORE USER PATTERNS, THE OPERATIONAL MODE CONFIGURED TO DETERMINE A CYCLE START TIME FOR A CURRENT WASH CYCLE

306  IMPLEMENT THE CURRENT WASH CYCLE AT THE DETERMINED CYCLE START TIME

308  AFTER COMPLETING THE CURRENT WASH CYCLE, UPDATE CYCLE INFORMATION STORED IN AT LEAST ONE OF A LOCAL MEMORY OR A CLOUD SERVER COMMUNICATIVELY COUPLED TO THE DISHWASHER APPLIANCE, THE CYCLE INFORMATION RELATING TO THE ONE OR MORE USER PATTERNS

310  CONTROL ONE OR MORE PARAMETERS OF A SUBSEQUENT WASH CYCLE OF A DISHWASHING APPLIANCE BASED ON THE UPDATED CYCLE INFORMATION

FIG. 4

METHOD OF OPERATING A DISHWASHER APPLIANCE TO LIMIT USER INVOLVEMENT

FIELD OF THE INVENTION

The present disclosure relates generally to dishwasher appliances, and more particularly to a method of operating a dishwasher appliance to limit user involvement.

BACKGROUND OF THE INVENTION

Dishwasher appliances generally include rack assemblies for positioning various articles for cleaning within a wash chamber. One or more devices such as nozzles or spray assemblies may be included at various locations relative to the rack assemblies for purposes of delivering fluids as part of the cleaning process. During the cleaning cycle, the rack assemblies support and position the articles while also having openings that allow fluid to pass through to the articles.

Dishwasher appliances are also often equipped with a controller having a user interface that allows a user to select and start a wash cycle. For many users, it is desirable to require as little effort as possible. For most users, however, once the wash cycle is started and completed, the dishwasher appliance sits idle waiting for the user to come back and unload the clean articles. For example, many users start the wash cycle at night and do not return until the next morning, afternoon, or evening to unload the clean articles. Therefore, oftentimes, the dishwasher appliance is active for about 1-2 hours while it runs the wash cycle, but then sits idly by for about five (5) hours or even as much as 15 hours. As a result, performance (e.g., wash and dry), user comfort (e.g., household shower time overlaps with dishwasher running time) and/or peak load are sacrificed for those appliances to simply sit idle for an extended period of time.

In addition, users may sometimes deviate from their established habits. Furthermore, a user's lifestyles may change, which could lead to the change of his or her dishwashing habits. For example, for a family of four with two children, dishwashing habits may change after the children go to college, such as only needing to run the dishwasher appliance every other day rather than every day. Moreover, many users generally desire minimal involvement in the dishwashing process even when their dishwashers are offline.

Accordingly, the present disclosure is directed to a method of operating a dishwasher appliance to limit user involvement that addresses the aforementioned issues.

BRIEF DESCRIPTION OF THE INVENTION

Aspects and advantages of the invention will be set forth in part in the following description, or may be apparent from the description, or may be learned through practice of the invention.

In an aspect, the present disclosure is directed to a method of operating a dishwasher appliance to limit user involvement. The method includes receiving, via a user interface of the dishwasher appliance, an indication from a user to start operation of the dishwasher appliance. The method also includes implementing an operational mode for the dishwasher appliance based on one or more user patterns, the operational mode configured to determine a cycle start time for a current wash cycle. Further, the method includes implementing the current wash cycle at the determined cycle start time. After completing the current wash cycle, the method includes updating cycle information stored in at least one of a local memory or a cloud server communicatively coupled to the dishwasher appliance, the cycle information relating to the one or more user patterns. Moreover, the method includes controlling one or more parameters of a subsequent wash cycle of the dishwashing appliance based on the updated cycle information.

In another aspect, the present disclosure is directed to a dishwasher appliance. The dishwasher appliance includes a tub defining a wash chamber for receipt of articles for washing. The dishwasher appliance also includes a controller having a user interface and at least one processor. The processor(s) is configured to perform a plurality of operations, including but not limited to receiving an indication from a user to start operation of the dishwasher appliance via the user interface, implementing an operational mode for the dishwasher appliance based on one or more user patterns, the operational mode configured to determine a cycle start time for a current wash cycle, implementing the current wash cycle at the determined cycle start time, after completing the current wash cycle, updating cycle information stored in at least one of a local memory or a cloud server communicatively coupled to the dishwasher appliance, the cycle information relating to the one or more user patterns, and controlling one or more parameters of a subsequent wash cycle of the dishwashing appliance based on the updated cycle information.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 4 illustrates a flow diagram of an embodiment of a method of operating a dishwasher appliance according to the present disclosure.

Figure 1:
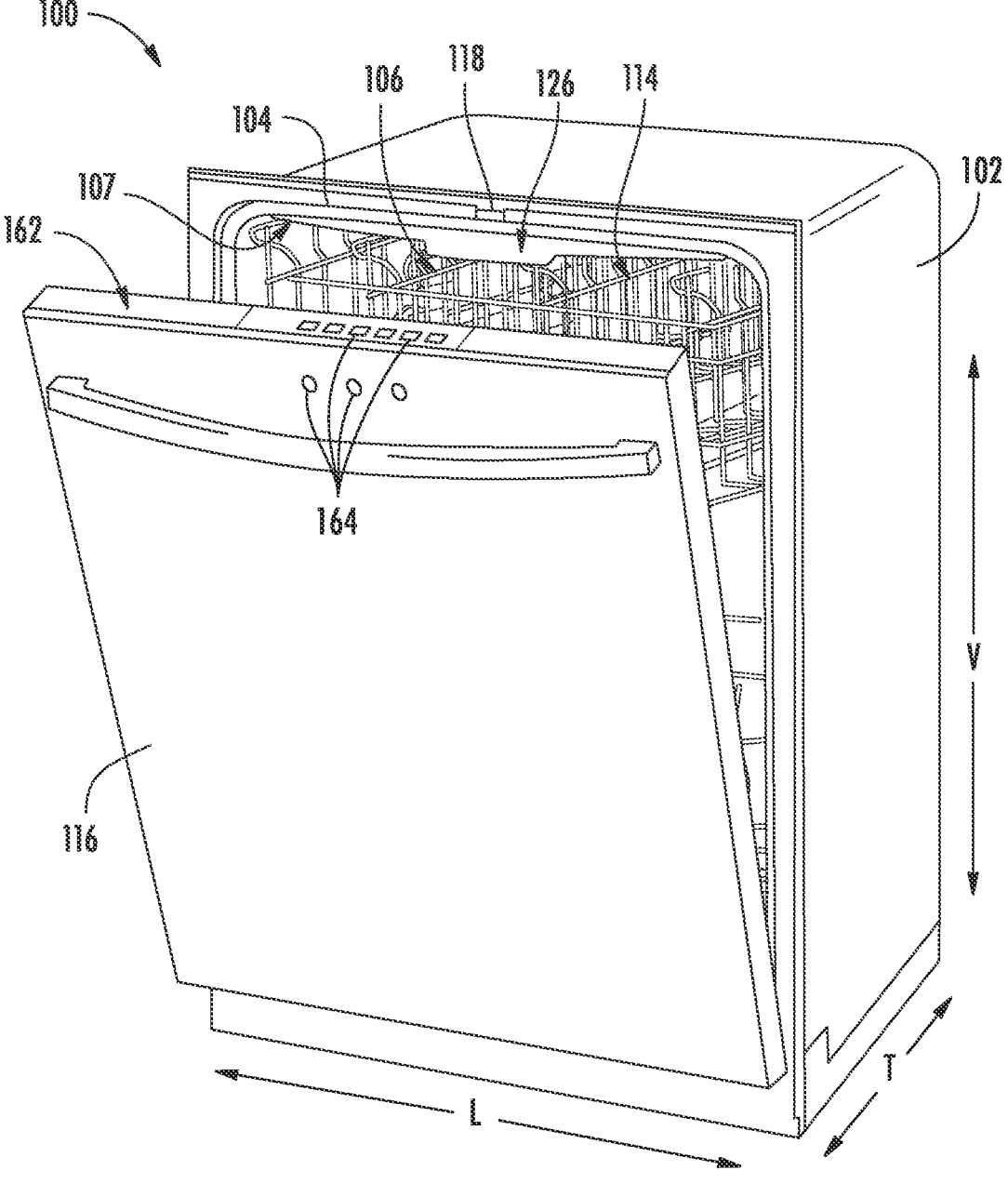
FIG. 1 illustrates a perspective view of an embodiment of a dishwashing appliance with a door in a partially open position according to the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

As used herein, the term "article" may refer to, but need not be limited to dishes, pots, pans, silverware, and other cooking utensils and items that can be cleaned in a dishwashing appliance. The term "wash cycle" is intended to refer to one or more periods of time during which a dishwashing appliance operates while containing the articles to be washed and uses a detergent and water, preferably with agitation, to e.g., remove soil particles including food and other undesirable elements from the articles. The term "rinse cycle" is intended to refer to one or more periods of time during which the dishwashing appliance operates to remove residual soil, detergents, and other undesirable elements that were retained by the articles after completion of the wash cycle. The term "drain cycle" is intended to refer to one or more periods of time during which the dishwashing appliance operates to discharge soiled water from the dishwashing appliance. The term "cleaning cycle" is intended to refer to one or more periods of time that may include a wash cycle, rinse cycle, and/or a drain cycle. The term "wash fluid" refers to a liquid used for washing and/or rinsing the articles and is typically made up of water that may include other additives such as detergent or other treatments.

Generally, the present disclosure is directed to a system and method of operating a dishwasher appliance with minimal user involvement and using existing hardware. In an embodiment, the present disclosure includes a change-oriented algorithm that delegates the task of running a dishwasher to an intelligent expert system, which becomes 1) the manager of a default mode of operation that guarantees zero user involvement without affecting the user's habits, and 2) the advisor of a special mode of operation that provides a user with the best option when the user needs or habits deviate from existing habits. For the default mode, the system determines a typical cycle end time based on historical data and then controls the timing of a wash cycle to maximize household benefits (e.g., cost savings by avoiding electricity peak time and/or user comfort by avoiding typical shower time) based on a user's entry of priorities. For the special mode, if allowable time is less than typical cycle time, then the system is configured to provide guidelines of user effort to help achieve the user's goal. As such, the appliance has the built-in ability to adjust and/or weight more recent behavior as the user's life changes or remains the same. In addition, the system is configured to provide a smooth transition between a unit's status of online (e.g., communicatively coupled to a network or cloud server) and offline (e.g., not communicatively coupled to a network or cloud server).

Figure 2:
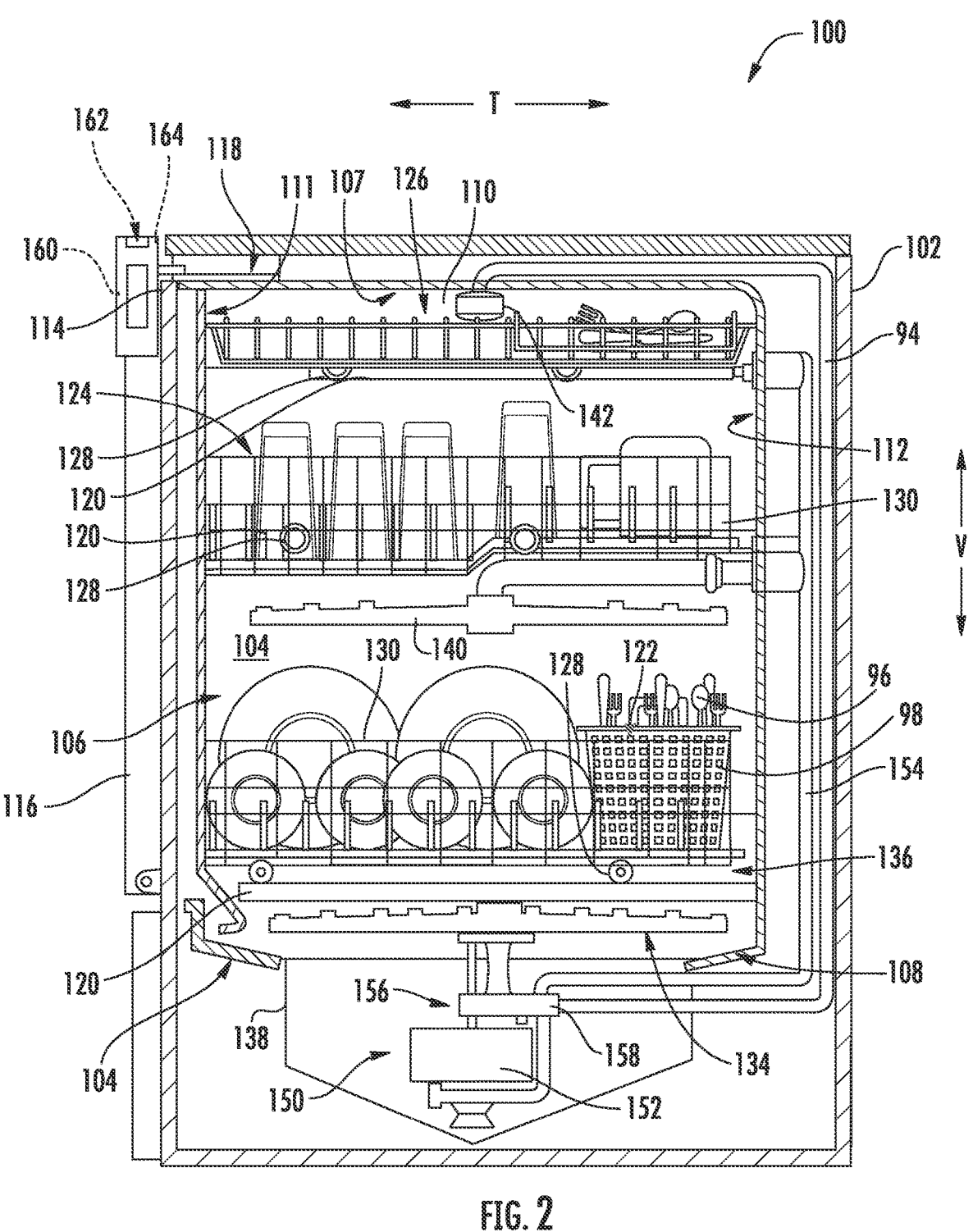
FIG. 2 illustrates a side, cross sectional view of the dishwashing appliance of FIG. 1.

Referring now to FIGS. 1 and 2, a domestic dishwasher or dishwashing dishwasher 100 that may be configured in accordance with aspects of the present disclosure is illustrated. For the particular embodiment of FIGS. 1 and 2, the dishwasher 100 includes a cabinet 102 (FIG. 2) having a tub 104 therein that defines a wash chamber 106. As shown in FIG. 2, the tub 104 extends between a top 107 and a bottom 108 along a vertical direction V, between a pair of side walls 110 along a lateral direction L, and between a front side 111 and a rear side 112 along a transverse direction T. Each of the vertical direction V, lateral direction L, and transverse direction T are mutually perpendicular to one another.

The tub 104 includes a front opening 114 and a door 116 hinged at its bottom for movement between a normally closed vertical position (shown in FIG. 2), wherein the wash chamber 106 is sealed shut for washing operation, and a horizontal open position for loading and unloading of articles from the dishwasher 100. According to exemplary embodiments, the dishwasher 100 further includes a door closure mechanism or assembly 118 that is used to lock and unlock the door 116 for accessing and sealing the wash chamber 106.

As further illustrated in FIG. 2, the side walls 110 accommodate a plurality of rack assemblies. More specifically, one or more guide rails 120 may be mounted to the side walls 110 for supporting a first rack assembly 122 (also referred to as a lower rack assembly 122), a middle rack assembly 124 (also referred to as a second rack assembly 124), and a third rack assembly 126 (also referred to as an upper rack assembly 126). As illustrated, the third rack assembly 126 is positioned at a top portion of the wash chamber 106 above the middle rack assembly 124, which is positioned above the lower rack assembly 122 along the vertical direction V. Each rack assembly 122, 124, 126 is adapted for movement between an extended loading position (not shown) in which the rack is substantially positioned outside the wash chamber 106, and a retracted position (shown in FIGS. 1 and 2) in which the rack is located inside the wash chamber 106. This is facilitated, for example, by rollers 128 mounted onto the rack assemblies 122, 124, 126, respectively. Although guide rails 120 and rollers 128 are illustrated herein as facilitating movement of the respective rack assemblies 122, 124, 126, it should be appreciated that any suitable sliding mechanism or member may be used according to alternative embodiments.

Some or all of the rack assemblies 122, 124, 126 are fabricated into lattice structures including a plurality of wires or elongated members 130 (for clarity of illustration, not all elongated members making up rack assemblies 122, 124, 126 are shown in FIG. 2). In this regard, the rack assemblies 122, 124, 126 are generally configured for supporting articles within the wash chamber 106 while allowing a flow of wash fluid to reach and impinge on those articles, e.g., during a cleaning or rinsing cycle. For this embodiment, a silverware basket 98 is removably attached to a rack assembly, e.g., the lower rack assembly 122, for placement of silverware 96, utensils, and the like, that are otherwise too small or delicate to be accommodated by the rack 122.

The dishwasher 100 further includes a plurality of spray assemblies for urging a flow of water or wash fluid onto the articles placed within wash chamber 106. More specifically, as illustrated in FIG. 2, the dishwasher 100 includes a first spray assembly 134 (also referred to as a lower spray arm assembly 134) disposed in a lower region 136 of wash chamber 106 and above a sump 138 so as to rotate in relatively close proximity to lower rack assembly 122. Similarly, a second spray assembly 140 (also referred to as a mid-level spray arm assembly 140) is located in an upper region of wash chamber 106 and may be located below and in close proximity to middle rack assembly 124. In this regard, mid-level spray arm assembly 140 may generally be configured for urging a flow of wash fluid up through middle rack assembly 124 and third rack assembly 126. Additionally, a third spray assembly 142 (also referred to as an upper spray assembly 142) may be located above the third rack assembly 126 along the vertical direction V. In this manner, the third spray assembly 142 may be configured for urging and/or cascading a flow of wash fluid downward over the rack assemblies 122, 124, and 126.

The various spray assemblies and manifolds described herein may be part of a fluid distribution system or fluid circulation assembly 150 for circulating water and wash fluid in the tub 104. More specifically, the fluid circulation assembly 150 includes a pump 152 for circulating water and wash fluid (e.g., detergent, water, and/or rinse aid) in the tub 104. The pump 152 may be located within the sump 138 or within a machinery compartment located below sump 138 of tub 104, as generally recognized in the art. Further, the fluid circulation assembly 150 may include one or more fluid conduits or circulation piping for directing water and/or wash fluid from the pump 152 to the various spray assemblies and manifolds. For example, as illustrated in FIG. 2, a primary supply conduit 154 may extend from the pump 152, along rear 112 of the tub 104 along the vertical direction V to supply wash fluid throughout wash chamber 106.

As illustrated, the primary supply conduit 154 is used to supply wash fluid to mid-level spray arm assembly 140 while a secondary supply conduit 94 supplies wash fluid to upper spray assembly 142. Further, as shown, a diverter assembly 156 can allow selection between spray assemblies 134, 140 and 142 being supplied with wash fluid. However, it should be appreciated that according to alternative embodiments, any other suitable plumbing configuration may be used to supply wash fluid throughout the various spray manifolds and assemblies described herein.

Each spray assembly 134, 140, 142 or other spray device may include an arrangement of discharge ports or orifices for directing wash fluid received from pump 152 onto dishes or other articles located in wash chamber 106. The arrangement of the discharge ports, also referred to as jets, apertures, or orifices, may provide a rotational force by virtue of wash fluid flowing through the discharge ports. Alternatively, the spray assemblies 134, 140, 142 may be motor-driven, or may operate using any other suitable drive mechanism. Spray manifolds and assemblies may also be stationary. Movement of the spray arm assemblies 134 and 140 and the spray from fixed manifolds like spray assembly 142 provides coverage of dishes, silverware, and other dishwasher contents and articles to be cleaned with a washing spray. Other configurations of spray assemblies may be used as well. For example, dishwasher 100 may have additional spray assemblies for cleaning silverware, for scouring casserole dishes, for spraying pots and pans, for cleaning bottles, etc. One skilled in the art will appreciate that the embodiments discussed herein are used for the purpose of explanation only and are not limitations of the present disclosure.

In operation, the pump 152 draws wash fluid in from the sump 138 and pumps it to the diverter assembly 156, e.g., which is positioned within the sump 138 of the dishwasher 100. The diverter assembly 156 may include a diverter disk (not shown) disposed within a diverter chamber 158 for selectively distributing the wash fluid to the spray assemblies 134, 140, 142 and/or other spray manifolds or devices. For example, the diverter disk may have a plurality of apertures that are configured to align with one or more outlet ports (not shown) at the top of the diverter chamber 158. In this manner, the diverter disk may be selectively rotated to provide wash fluid to the desired spray device.

Referring particularly to FIG. 2, the dishwasher 100 is further equipped with a controller 160 to regulate operation of the dishwasher 100. The controller 160 may include one or more memory devices and one or more microprocessors, such as general or special purpose microprocessors operable to execute programming instructions or micro-control code associated with a cleaning cycle. The memory may represent random access memory such as DRAM or read only memory such as ROM or FLASH. In one embodiment, the processor executes programming instructions stored in memory. The memory may be a separate component from the processor or may be included onboard within the processor. Alternatively, controller 160 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 160 may be positioned in a variety of locations throughout dishwasher 100. In the illustrated embodiment, for example, the controller 160 may be located within a user interface 162 of door 116. In such an embodiment, input/output ("I/O") signals may be routed between the control system and various operational components of the dishwasher 100 along wiring harnesses that may be routed through the bottom of door 116. Typically, the controller 160 includes a user interface panel/controls 164 through which a user may select various operational features and modes and monitor progress of the dishwasher 100. In an embodiment, the user interface 164 may represent a general purpose I/O ("GPIO") device or functional block. In an embodiment, the user interface 164 may include input components, such as one or more of a variety of electrical, mechanical or electro-mechanical input devices including rotary dials, push buttons, and touch pads. The user interface 164 may include a display component, such as a digital or analog display device designed to provide operational feedback to a user. The user interface 164 may be in communication with the controller 160 via one or more signal lines or shared communication busses.

In an embodiment, the dishwasher 100 may also be configured to communicate wirelessly with a cloud-server that may include a database or may be, e.g., a cloud-based data storage system and may also include image recognition and processing capabilities including artificial intelligence as further described below. For example, the dishwasher 100 may communicate with the cloud-server over the Internet, and the dishwasher 100 may access via WI-FI®, such as from a WI-FI® access point in a user's home or through a mobile device. Alternatively, the dishwasher 100 may be equipped with such image recognition and processing capabilities as part of the controller 160 and/or other components onboard the dishwasher 100.

It should be appreciated that the invention is not limited to any particular style, model, or configuration of the dishwasher 100. The embodiment depicted in FIGS. 1 and 2 is for illustrative purposes only. For example, different locations may be provided for the user interface 164, different configurations may be provided for the rack assemblies 122, 124, 126, different spray assemblies 134, 140, 142 and spray manifold configurations may be used, and other differences may be applied while remaining within the scope of the present disclosure.

Figure 3:
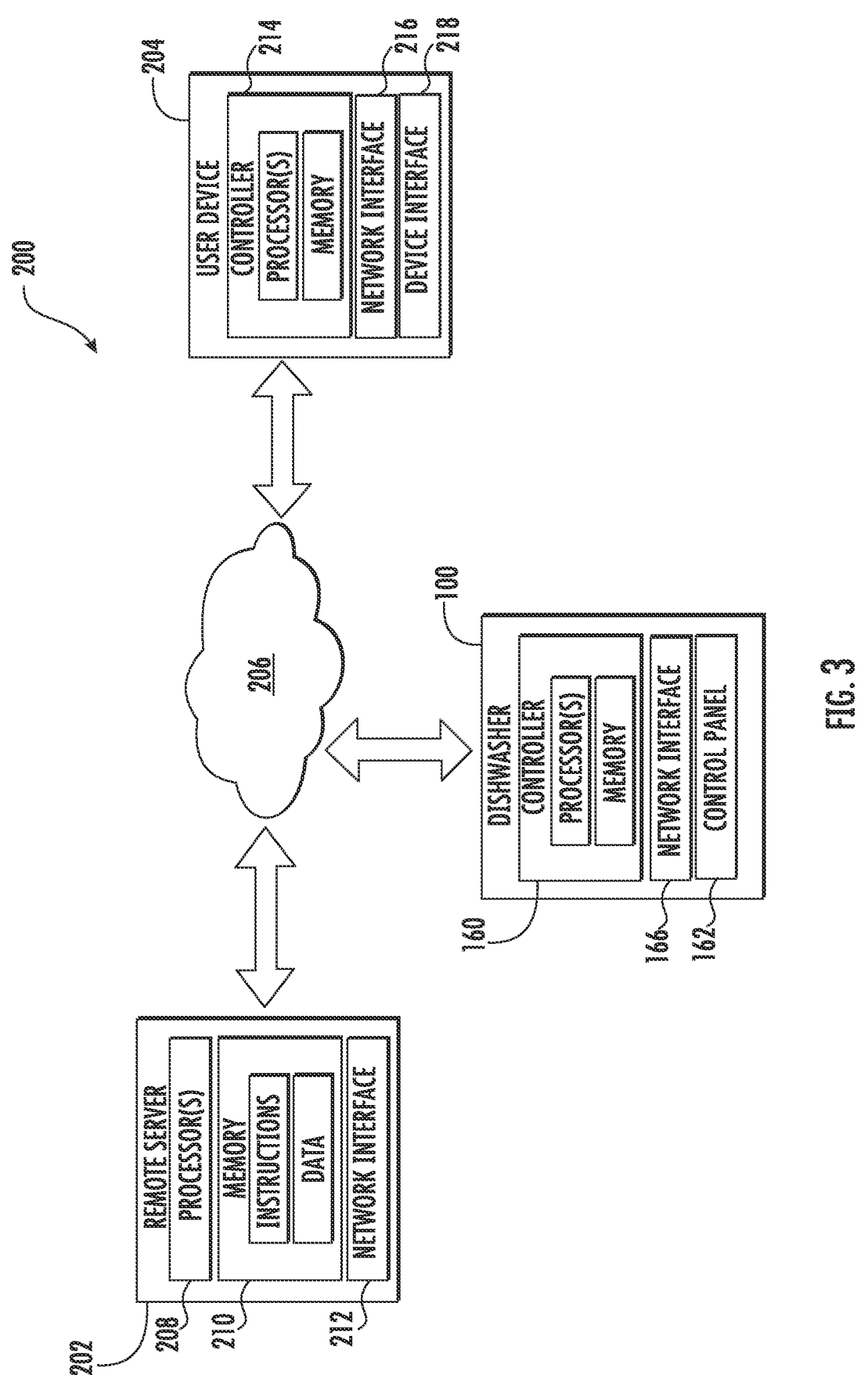
FIG. 3 illustrates a schematic view of an embodiment of a system for operating a dishwasher appliance according to the present disclosure.

Referring now to FIG. 3, a schematic view is provided of a system 200 that includes the dishwasher 100, one or more remote servers 202, and one or more user devices 204 is illustrated. As shown, the dishwasher 100 can be communicatively coupled with a network 206 and various other nodes, such as the remote server 202 and the user device 204.

In some embodiments, the controller 160 includes a network interface 166 such that controller 160 can connect to and communicate over one or more networks (e.g., network 206) with one or more network nodes. The controller 160 can also include one or more transmitting, receiving, or transceiving components for transmitting/receiving communications with other devices communicatively coupled with the dishwasher 100. Additionally or alternatively, one or more transmitting, receiving, or transceiving components can be located off board of the controller 160.

The network 206 can be any suitable type of network, such as a local area network (e.g., intranet), wide area network (e.g., internet), low power wireless networks [e.g., Bluetooth Low Energy (BLE)], or some combination thereof and can include any number of wired or wireless links. In general, communication over the network 206 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

In some embodiments, the remote server 202, such as a web server, is in operative communication with the dishwasher 100. The server 202 can be used to host an information database (e.g., image database, user database, etc.). The server 202 can be implemented using any suitable computing device(s). The server 202 may include one or more processors 208 and one or more memory devices 210 (i.e., memory). The processor(s) 208 can be any suitable processing device (e.g., a processor core, a microprocessor, an ASIC, a FPGA, a microcontroller, etc.) and can be one processor or a plurality of processors that are operatively connected. The memory device(s) 210 can include one or more non-transitory computer-readable storage mediums, such as RAM, ROM, EEPROM, EPROM, flash memory devices, magnetic disks, etc., and combinations thereof. The memory device(s) 210 can store data and instructions which are executed by the processor(s) 208 to cause remote server 202 to perform operations.

The memory device(s) 210 may also include data, such as usage data, historical use data, etc., that can be retrieved, manipulated, created, or stored by the processor(s) 208. The data can be stored in one or more databases. The database(s) can be connected to the remote server 202 by a high bandwidth LAN or WAN or can also be connected to remote server 202 through the network 206. The database(s) can be split up so that they are located in multiple locales.

Further, the remote server 202 includes a network interface 212 such that the remote server 202 can connect to and communicate over one or more networks (e.g., network 206) with one or more network nodes. The network interface 212 can be an onboard component or it can be a separate, offboard component. In turn, the remote server 202 can exchange data with one or more nodes over the network 206.

In particular, the remote server 202 can exchange data with the dishwasher 100 and/or the user device 204. Although not pictured, it is understood that the remote server 202 may further exchange data with any number of client devices over the network 206. The client devices can be any suitable type of computing device, such as a general purpose computer, special purpose computer, laptop, desktop, integrated circuit, mobile device, smartphone, tablet, or other suitable computing device.

In certain embodiments, the user device 204 is communicatively coupled with the network 206 such that the user device 204 can communicate with the dishwasher 100. For instance, the user device 204 can communicate directly with the dishwasher 100 via the network 206. Alternatively, a user can communicate indirectly with the dishwasher 100 by communicating via the network 206 with the remote server 202 (e.g., directly or indirectly through one or more intermediate remote servers), which in turn communicates with the dishwasher 100 via the network 206. Moreover, a user can be in operative communication with the user device 204 such that the user can communicate with the dishwasher 100 via the user device 204.

The user device 204 can be any type of remote device, such as, for example, a personal computing device (e.g., laptop or desktop), a mobile computing device (e.g., smartphone or tablet), a gaming console or controller, a wearable computing device, an embedded computing device, a remote, or any other suitable type of user computing device. The user device 204 can include one or more user device controllers 214. The user device controller 214 can include one or more processors and one or more memory devices. The processor(s) can be any suitable processing device (e.g., a processor core, a microprocessor, an ASIC, a FPGA, a controller, a microcontroller, etc.) and can be one processor or a plurality of processors that are operatively connected. The memory device (i.e., memory) can include one or more non-transitory computer-readable storage mediums, such as RAM, ROM, EEPROM, EPROM, flash memory devices, magnetic disks, etc., and combinations thereof. The memory can store data and instructions which are executed by the processor(s) to cause the user device 204 to perform operations. The user device controller 214 can also include a network interface 216 such that user device 204 can connect to and communicate over one or more networks (e.g., network 206) with one or more network nodes. The network interface 216 can be an onboard component of user device controller 214 or it can be a separate, off board component. The user device controller 214 can also include one or more transmitting, receiving, or transceiving components for transmitting/receiving communications with other devices communicatively coupled with the user device 204. Additionally, or alternatively, one or more transmitting, receiving, or transceiving components can be located off board of the controller 214.

Still referring to FIG. 3, the user device 204 may include a device interface 218 having one or more user inputs such as, for example, buttons, one or more cameras, or a monitor configured to display graphical user interfaces or other visual representations to user. For example, the device interface 218 can include a display that can present or display graphical user interfaces corresponding to operational features of the dishwasher 100 such that user may manipulate or select the features to operate the dishwasher 100. The display of the user device 204 can be a touch sensitive component (e.g., a touch-sensitive display screen or a touch pad) that is sensitive to the touch of a user input object (e.g., a finger or a stylus). For example, a user may touch the display with his or her finger and type in a series of numbers on the display. In addition, motion of the user input object relative to the display can enable user to provide input to the user device 204. The user device 204 may provide other suitable methods for providing input to the user device 204 as well. Moreover, the user device 204 can include one or more speakers, one or more cameras, or more than one microphones such that the user device 204 is configured with voice control, motion detection, and other functionality.

Generally, a user may be in operative communication with the dishwasher 100 or one or more user devices 204. For instance, a user may wish to alternately operate the dishwasher 100 directly (e.g., through the user interface 162 (FIGS. 1-3) or remotely (e.g., through the user device 204). In particular, a user may wish to control operational features that include starting a wash cycle of the dishwasher 100, etc.

Referring now to FIG. 4, a flow diagram of an embodiment of a method 300 of operating a dishwashing appliance, such as dishwasher 100, to limit user involvement, will be described. Although the discussion below refers to the method 300 of operating the dishwasher 100, one skilled in the art will appreciate that the method 300 is applicable to the operation of a variety of other dishwashing appliances having different configurations and equipment and that the steps disclosed herein may be performed by e.g., controller 160 in whole, or in part, and in conjunction with one or more separate systems including cloud-based systems. Reference to a "step" or other action does not prevent such from being performed in a series of steps or multiple actions unless otherwise stated. The order of such steps or actions may also be altered unless otherwise stated.

As shown at (302), the method 300 includes receiving, via a user interface of the dishwasher appliance, an indication from a user to start operation of the dishwasher appliance. For example, through the user interface 162, a user may actuate a wash cycle of the dishwasher 100. Such may include the selection, using the user interface 162 of one or more options for the wash cycle followed by closing the door 116. Activation may also come after a period of delay, which the user may select.

As shown at (304), the method 300 includes implementing an operational mode for the dishwasher appliance based on one or more user patterns. As used herein, the user pattern(s) may include usage data stored in a local memory (e.g., such as historical or previous usage data) of the dishwasher 100 or existing (e.g., present or current) user patterns. Further, as shown, the operational mode is configured to determine a cycle start time for a current (i.e., the present) wash cycle. For example, in an embodiment, the operational mode may include a default mode if the user pattern(s) are reflective of existing habits of the user. For example, in an embodiment, the default mode may include determining the cycle start time for the wash cycle based on the user pattern(s) and one or more household benefit opportunities. In another embodiment, the operational mode may include a special mode if the user pattern(s) deviate from the existing habits of the user. For example, in an embodiment, the special mode may include determining the cycle start time for the wash cycle based on the user pattern(s) and at least one of a cycle end time selected by the user or the household benefit opportunities.

In an embodiment, for example, the household benefit opportunities may include scheduling around electricity peak, other household water usage above a certain threshold, and/or household activities in which low noise is desirable. Moreover, in an embodiment, the method 300 may include receiving the household benefit opportunities, e.g., via the user interface 162 from the user. Accordingly, in an embodiment, the user is able to update the household benefit opportunities periodically or when desired.

As shown at (306), the method 300 includes implementing the current wash cycle at the determined cycle start time. After completing the current wash cycle, as shown at (308), the method 300 includes updating cycle information stored in at least one of a local memory or a cloud server communicatively coupled to the dishwasher appliance, the cycle information relating to the one or more user patterns. As shown at (310), the method 300 includes controlling one or more parameters of a subsequent wash cycle of the dishwashing appliance based on the updated cycle information.

Figure 5:
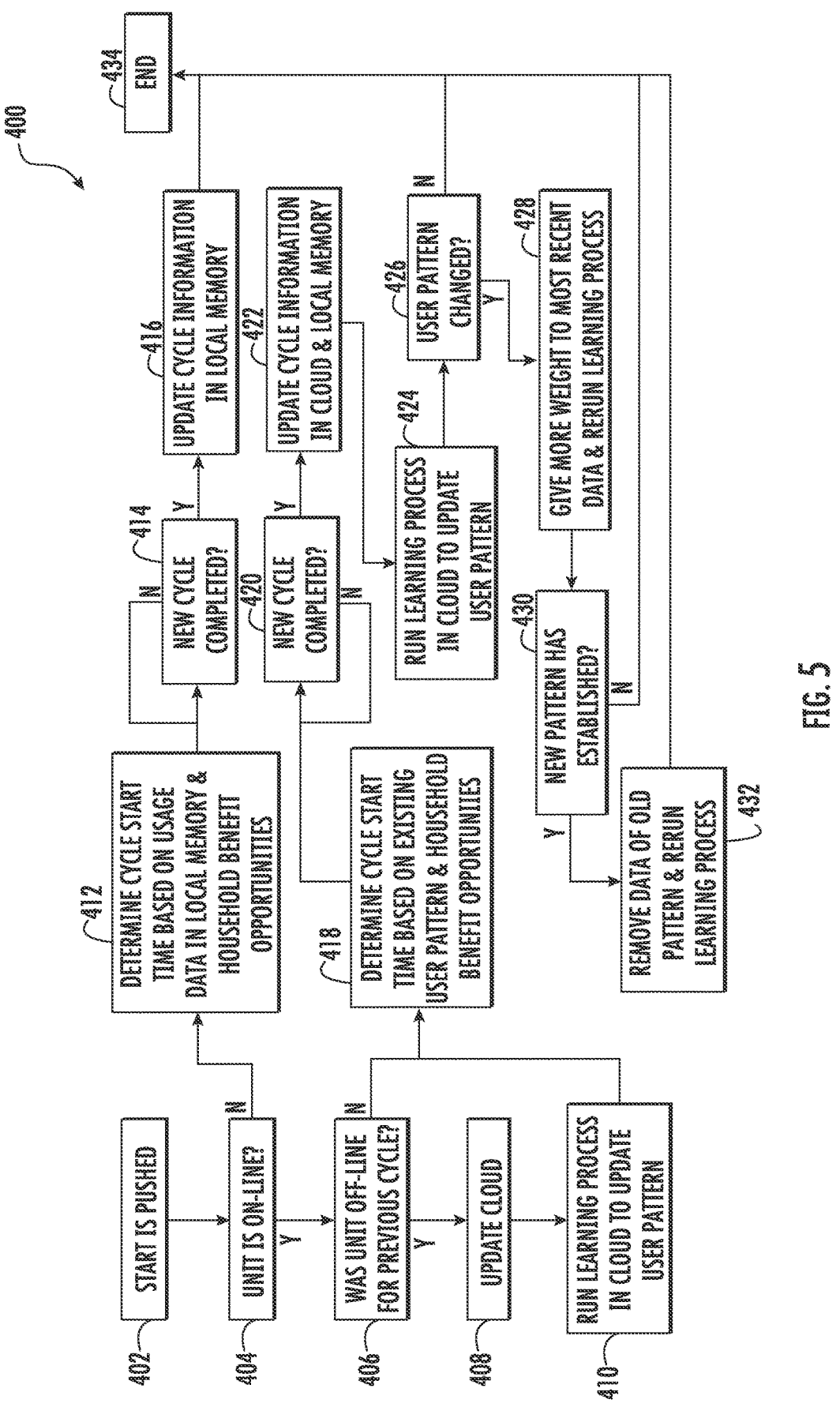
FIG. 5 illustrates a flow diagram of an embodiment of an algorithm for operating a dishwasher appliance according to the present disclosure.

The method 300 of FIG. 4 can be better understood with respect to FIG. 5. In particular, as shown, FIG. 5 illustrates a flow diagram of an embodiment of an algorithm 400 for operating a unit, such as dishwasher 100, to limit user involvement. As shown at (402), the algorithm 400 receives an indication that a user has pushed or otherwise caused a start operation of the unit to begin.

As shown at (404), the algorithm 400 may include determining whether the unit is online. If yes, as shown at (406), the algorithm 400 may include determining whether the unit was offline for a previous wash cycle (e.g., that occurred before the current wash cycle). If yes, as shown at (408), the algorithm 400 may include updating the cloud server. Moreover, as shown at (410), the algorithm 400 may include running a learning process, such as a machine learning process, in the cloud server to update the user pattern(s) of the user. In an embodiment, the learning process may be based on unsupervised learning with multiple dimensions, including but not limited to time of day, days of the week, season, and holidays, among others. Further, in an embodiment, the process may include two main steps: firstly, utilizing cluster analysis to determine if the user patterns have changed across multiple wash cycles, and secondly, identifying the preferred user pattern for the time interval between START and the first door opening.

However, if the unit was offline for the current wash cycle, as shown at (412), the algorithm 400 implements the default mode of operation, which includes determining a cycle start time based on usage data stored in a local memory (such as the memory in the controller 160) and the household benefit opportunities. As shown at (414), the algorithm 400 may include determining whether the new wash cycle is completed. If so, as shown at (416), the algorithm 400 may include updating the cycle information in the local memory. Further, as shown at (434), the algorithm 400 may end after updating the cycle information in the local memory in the event that the unit is offline.

If, however, the unit was online for the previous wash cycle, then, as shown at (418), the algorithm 400 implements the default mode of operation, which includes determining a cycle start time based on the existing user patterns and the household benefit opportunities. As shown at (420), the algorithm 400 may further include determining whether the new wash cycle is completed. If so, as shown at (422), the algorithm 400 may include updating the cycle information in the cloud server and the local memory. More specifically, as shown at (424), the algorithm 400 may include implementing a learning process in the cloud server to update the user pattern(s). As shown at (426), the algorithm 400 may include determining whether the user pattern(s) changed across a plurality of wash cycles. For example, in an embodiment, the algorithm 400 may determine whether the user pattern(s) changed across the plurality of wash cycles by utilizing cluster analysis.

If no change in the user pattern(s) is detected, as shown at (434), the algorithm 400 ends. If, however, a change is detected in the user pattern(s) across the plurality of wash cycles, as shown at (428), the algorithm 400 implements the special mode of operation, which may include applying more weight to one or more recent user patterns of the user pattern(s) than historical user patterns of the user pattern(s) and re-implementing the learning process to update the cycle information. Thus, as shown at (430), the algorithm 400 includes determining whether a new user pattern is established. If so, as shown at (432), the algorithm 400 may include removing the historical (e.g., old or outdated) user patterns of the user pattern(s) after establishing the new user pattern and re-implementing the learning process to further update the cycle information. Further, as shown at (434), the algorithm 400 ends.

Accordingly, in an embodiment, the method 300 and algorithm 400 described herein are configured to significantly reduce user involvement in the dishwashing process, e.g., when a user continues with existing habits, when a user deviates from existing habits temporally or permanently, when a dishwasher is offline at all times, and/or when a dishwasher transitions between online and offline.

More particularly, when a user continues with existing habits, the entire dishwashing task is delegated in that, after the user starts the wash cycle, the dishwasher goes into the default mode. As mentioned, the default mode includes determining the timing of the wash cycle to correspond with the user's habits while maximizing certain household benefits, such as cost savings (e.g., avoiding electricity peak) and user comfort (e.g., avoiding typical shower time). In certain embodiments, household benefits with priorities can be entered by the user and can be updated at any time.

In another scenario, when a user deviates from existing habits, the majority of the dishwashing task is delegated in that, after the user selects the special mode, the method 300/algorithm 400 provides the best option based on the user's input of the targeted cycle end time. If the allowable time is more than user's typical cycle time, then no user effort is needed, and the method 300/algorithm 400 is configured to determine when to run the wash cycle while also maximizing household benefits. In an embodiment, if the allowable time is less than user's typical cycle time, then a quick wash cycle can be suggested, and the user can be reminded to load the dishwasher with lightly soiled items.

In still another scenario, when the dishwasher 100 is offline all the time, the entire dishwashing task is delegated in that, a simplified version of the method 300/algorithm 400 can be run locally through a calculation of an average time between starting the wash cycle and the door 116 being opened for different hours of the day. More specifically, for an online dishwasher, habits of the user can be tracked by key dimensions that include but are not limited to time of the day, days of the week, season and holiday, etc. For an offline dishwasher, habits of the user can be tracked by one dimension.

In yet another scenario, when the dishwasher 100 transitions between online and offline, the entire dishwashing task is delegated in that, a smooth transition is provided between online and offline status, as further explained with respect to FIG. 5.

Moreover, in another scenario, the algorithm 400 is configured to accommodate temporary and permanent deviation in the user's habits. For example, in an embodiment, the cloud server is configured to determine if a deviation from an existing pattern is temporary or permanent based on cluster analysis. When a permanent pattern change is detected, more weight can be given to the most recent data in the continuous learning process. When it is confirmed that a new pattern has been established, cycles of old habits can be removed from a future learning process' training data.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method of operating a dishwasher appliance to limit user involvement, the method comprising:
   receiving, via a user interface of the dishwasher appliance, an indication from a user to start operation of the dishwasher appliance;
   implementing an operational mode for the dishwasher appliance based on one or more user patterns, the operational mode configured to determine a cycle start time for a current wash cycle;
   implementing the current wash cycle at the determined cycle start time;
   after completing the current wash cycle, updating cycle information stored in at least one of a local memory or a cloud server communicatively coupled to the dishwasher appliance, the cycle information relating to the one or more user patterns, wherein updating the cycle information stored in at least one of the local memory or the cloud server communicatively coupled to the dishwasher appliance further comprises:
   implementing a machine learning process in the cloud server to update the one or more user patterns;
   determining whether the one or more user patterns changed across a plurality of wash cycles;
   if the one or more user patterns changed across the plurality of wash cycles, applying more weight to one or more recent user patterns of the one or more user patterns than historical user patterns of the one or more user patterns to establish a new user pattern; and
   re-implementing the machine learning process to further update the cycle information; and
   controlling one or more parameters of a subsequent wash cycle of the dishwashing appliance based on the updated cycle information.

2. The method of claim 1, wherein the operational mode comprises one of a default mode if the one or more user patterns are reflective of existing habits of the user or a special mode if the one or more user patterns deviate from the existing habits of the user.

3. The method of claim 2, wherein the default mode comprises determining the cycle start time for the wash cycle based on the one or more user patterns and one or more household benefit opportunities.

4. The method of claim 3, wherein the special mode comprises determining the cycle start time for the wash cycle based on the one or more user patterns and at least one of a cycle end time selected by the user or the one or more household benefit opportunities.

5. The method of claim 4, wherein the one or more household benefit opportunities comprise scheduling around at least one of electricity peak, other household water usage above a certain threshold, or household activities in which low noise is desirable.

6. The method of claim 4, further comprising receiving the one or more household benefit opportunities via the user interface from the user, wherein the user is able to update the one or more household benefit opportunities periodically.

7. The method of claim 2, further comprising determining whether the dishwasher appliance is offline or online for the current wash cycle, the one or more user patterns comprising at least one of usage data stored in the local memory of the dishwasher appliance or existing user patterns, wherein, when the dishwasher appliance is offline for the current wash cycle, the default mode comprises determining the cycle start time for the current wash cycle based on the usage data stored in the local memory and one or more household benefit opportunities.

8. The method of claim 7, further comprising determining whether the dishwasher appliance was online or offline for a previous wash cycle that occurred before the current wash cycle, wherein, when the dishwasher appliance is online for the current wash cycle and online for the previous wash cycle, the default mode comprises determining the cycle start time for the current wash cycle based on the existing user patterns and the one or more household benefit opportunities.

9. The method of claim 8, wherein, when the dishwasher appliance is online for the current wash cycle and offline for the previous wash cycle, the method further comprises:

updating the cloud server; and running a learning process in the cloud server to update the one or more user patterns of the user.

10. The method of claim 1, wherein determining whether the one or more user patterns changed across the plurality of wash cycles further comprises utilizing cluster analysis.

11. The method of claim 1, further comprising:

removing the historical user patterns of the one or more user patterns after establishing the new user pattern; and re-implementing the learning process to further update the cycle information after removal of the historical user patterns of the one or more user patterns.

12. A dishwasher appliance, comprising:

a tub defining a wash chamber for receipt of articles for washing;

a controller comprising a user interface and at least one processor, the at least one processor configured to perform a plurality of operations, the plurality of operations comprising:

receiving an indication from a user to start operation of the dishwasher appliance via the user interface;

implementing an operational mode for the dishwasher appliance based on one or more user patterns, the operational mode configured to determine a cycle start time for a current wash cycle;

implementing the current wash cycle at the determined cycle start time;

after completing the current wash cycle, updating cycle information stored in at least one of a local memory or a cloud server communicatively coupled to the dishwasher appliance, the cycle information relating to the one or more user patterns, wherein updating the cycle information stored in at least one of the local memory or the cloud server communicatively coupled to the dishwasher appliance further comprises:

implementing a machine learning process in the cloud server to update the one or more user patterns;

determining whether the one or more user patterns changed across a plurality of wash cycles;

if the one or more user patterns changed across the plurality of wash cycles, applying more weight to one or more recent user patterns of the one or more user patterns than historical user patterns of the one or more user patterns to establish a new user pattern; and re-implementing the machine learning process to further update the cycle information; and controlling one or more parameters of a subsequent wash cycle of the dishwashing appliance based on the updated cycle information.

13. The dishwasher appliance of claim 12, wherein the operational mode comprises one of a default mode if the one or more user patterns are reflective of existing habits of the user or a special mode if the one or more user patterns deviate from the existing habits of the user, wherein the default mode comprises determining the cycle start time for the wash cycle based on the one or more user patterns and one or more household benefit opportunities, wherein the special mode comprises determining the cycle start time for the wash cycle based on the one or more user patterns and at least one of a cycle end time selected by the user or the one or more household benefit opportunities, and wherein the one or more household benefit opportunities comprise scheduling around at least one of electricity peak, other household water usage above a certain threshold, or household activities in which low noise is desirable.

14. The dishwasher appliance of claim 13, wherein the plurality of operations further comprises:

receiving the one or more household benefit opportunities via the user interface from the user, wherein the user is able to update the one or more household benefit opportunities periodically.

15. The dishwasher appliance of claim 13, wherein the plurality of operations further comprises:

determining whether the dishwasher appliance is offline or online for the current wash cycle, the one or more user patterns comprising at least one of usage data stored in the local memory of the dishwasher appliance or existing user patterns, wherein, when the dishwasher appliance is offline for the current wash cycle, the default mode comprises determining the cycle start time for the current wash cycle based on the usage data stored in the local memory and one or more household benefit opportunities.

16. The dishwasher appliance of claim 15, wherein the plurality of operations further comprises:

determining whether the dishwasher appliance was online or offline for a previous wash cycle that occurred before the current wash cycle, wherein, when the dishwasher appliance is online for the current wash cycle and online for the previous wash cycle, the default mode comprises determining the cycle start time for the current wash cycle based on the existing user patterns and the one or more household benefit opportunities.

17. The dishwasher appliance of claim 16, wherein, when the dishwasher appliance is online for the current wash cycle and offline for the previous wash cycle, the dishwasher appliance further comprises:

updating the cloud server; and running a learning process in the cloud server to update the one or more user patterns of the user.

18. The dishwasher appliance of claim 12, wherein the plurality of operations further comprises:

removing the historical user patterns of the one or more user patterns after establishing the new user pattern; and re-implementing the learning process to further update the cycle information after removal of the historical user patterns of the one or more user patterns.

* * * * *